(12) United States Patent
Santhar et al.

(10) Patent No.: US 11,966,708 B2
(45) Date of Patent: Apr. 23, 2024

(54) DYNAMIC CONTRACTION AND EXPANSION OF HEURISTIC BEAM WIDTH BASED ON PREDICTED PROBABILITIES

(71) Applicant: INTERNATIONAL BUSINESS MACHINES CORPORATION, Armonk, NY (US)

(72) Inventors: Sathya Santhar, Chennai (IN); Sridevi Kannan, Chennai (IN); Suvedhahari Velusamy, Coimbatore (IN); Kothagorla Lakshmana Rao, Chirala (IN)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 17/491,671

(22) Filed: Oct. 1, 2021

(65) Prior Publication Data

US 2023/0108574 A1    Apr. 6, 2023

(51) Int. Cl.
*G06F 40/44*    (2020.01)
*G06F 40/58*    (2020.01)
*G06N 3/047*    (2023.01)

(52) U.S. Cl.
CPC .............. *G06F 40/44* (2020.01); *G06F 40/58* (2020.01); *G06N 3/047* (2023.01)

(58) Field of Classification Search
CPC .................................. G06N 5/01; G06N 7/01
See application file for complete search history.

(56) References Cited

U.S. PATENT DOCUMENTS 10,346,548 B1 *  7/2019  Wuebker .................. G06F 40/58
10,706,840 B2 *  7/2020  Sak .......................... G06N 3/045
(Continued)

FOREIGN PATENT DOCUMENTS

JP    2017021422    1/2017
JP    2019185392    10/2019

OTHER PUBLICATIONS

Pagliari et al. "Sequence-to-Sequence Neural Networks Inference on Embedded Processors Using Dynamic Beam Search". Electronics 2020, 9, 337; doi: 10.3390/electronics9020337, Published Feb. 15, 2020 (Year: 2020).*

(Continued)

*Primary Examiner* — Jesse S Pullias
(74) *Attorney, Agent, or Firm* — Schmeiser, Olsen & Watts, LLP; Edward Wixted

(57) ABSTRACT

A method, computer program product, and computer system for translating, using a beam search, a source sentence in a source language into a target sentence in a target language by an iterative process. Each iteration of the iterative process includes: generating, using a sequence-to-sequence model, probability vectors of conditional probabilities of respective vocabulary words in the target language being translations of a source word in the source sentence; sorting the probabilities in the probability vectors; generating probability difference vectors containing numerical differences between adjacent elements in respective sorted probability; vectors determining, by a fully connected neural network (FCNN), a best beam width B using the probability difference vectors as input to the FCNN; selecting B vocabulary words and B target vectors corresponding to the B highest conditional probabilities; and after all words in the source sentence have been translated, outputting the B target vectors generated in the last iteration.

20 Claims, 13 Drawing Sheets

(56) References Cited

U.S. PATENT DOCUMENTS

| | | | |
|---|---|---|---|
| 2017/0068665 A1 | 3/2017 | Tamura | |
| 2018/0300317 A1* | 10/2018 | Bradbury | G06F 40/44 |
| 2019/0130249 A1* | 5/2019 | Bradbury | G06N 3/084 |
| 2019/0266246 A1* | 8/2019 | Wang | G10L 15/28 |
| 2020/0034436 A1* | 1/2020 | Chen | G06N 3/08 |

OTHER PUBLICATIONS

Bausch et al., A Quantum Search Decoder for Natural Language Processing, Quantum Machine Intelligence 3.1 (Feb. 9, 2021): 1-24; https://link.springer.com/content/pdf/10.1007/s42484-021-00041-1.pdf, 24 pages.

Vijayakumar et al., Diverse Beam Search: Decoding Diverse Solutions From Neural Sequence Models, Oct. 22, 2018, https://arxiv.org/pdf/1610.02424.pdf, 16 pages.

Mell, Peter et al.; "The NIST Definition of Cloud Computing;" National Institute of Standards and Technology; Special Publication 800-145; Sep. 2011; 7 pages.

* cited by examiner

DYNAMIC CONTRACTION AND EXPANSION OF HEURISTIC BEAM WIDTH BASED ON PREDICTED PROBABILITIES

BACKGROUND

Embodiments of the present invention relate generally to translating a source sentence in a source language into a target sentence in a target language. More particularly, embodiments of the present invention relate to translating a source sentence in a source language into a target sentence in a target language using a beam search.

SUMMARY

Embodiments of the present invention provide a method, a computer program product and a computer system, for translating, using a beam search, a sentence S comprising n source words $S_1, \ldots, S_n$ in a source language into a sentence T comprising n target words $T_1, \ldots, T_n$ in a target language having a vocabulary characterized by a vocabulary vector V of m vocabulary words denoted as $V_1, \ldots, V_m$, wherein $n \geq 2$ and $m \geq 3$.

The method comprises: performing in sequence, by one or more processors of a computer system, successive iterations 1, 2, ... of an iterative process, where after setting i to 1 and $J_1$ to 1, performing iteration i of the iterative process comprises the following steps.

$J_i$ probability vectors $P_{ij}$ (j=1, 2, ... $J_i$) are generated via implementation of a sequence-to-sequence model, where each probability vector $P_{ij}$ has m elements $P_{ijk}$ (k=1, 2, ... m), where each element $P_{ijk}$ of the probability vector $P_{ij}$ is a conditional probability of a respective vocabulary word $V_k$ being a translation of the source word $S_i$, where for i>1, the vocabulary word $V_k$ (k=1, 2, ..., m) terminates a target vector of vocabulary words selected in iteration i−1.

Each probability vector $P_{ij}$ (j=1, 2, ..., $J_i$) is sorted in descending order or ascending order of the elements in each probability vector $P_{ij}$.

$J_i$ probability difference vectors respectively corresponding to the $J_i$ sorted probability vectors are generated, where each element of each probability difference vector is a numerical difference between adjacent elements in respective sorted probability vectors.

If i<n, a beam width $B_i$ is determined via execution of a fully connected neural network (FCNN) using the $J_i$ probability difference vectors and $J_{i+1}$ is computed as equal to $B_i$.

If i=n, the beam width $B_n$ is set equal q, where q is a specified positive integer subject to $1 \leq q \leq n$.

$B_i$ vocabulary words corresponding to the $B_i$ highest conditional probabilities in the $J_i$ probability vectors $P_{ij}$ (j=1, 2, ..., $J_i$) are selected.

If i=1, $B_i$ target vectors respectively comprising the selected $B_i$ vocabulary words are generated or if i>1, the $B_i$ target vectors are generated by adding the selected vocabulary word to the end of respective target vectors generated in iteration i−1, where each target vector generated in iteration i has a translation probability equal to the conditional probability of the selected vocabulary word at the end of the target vector.

If at least one stop condition is satisfied, the $B_n$ target vectors are outputted and the iterative process is stopped, where the at least one stop condition comprises a first stop condition of i=n. If the at least one stop condition is not satisfied, then i is incremented by 1 and the iterative process loops back to generating the $J_i$ probability vectors to perform the next iteration i.

DETAILED DESCRIPTION

Figure 1:
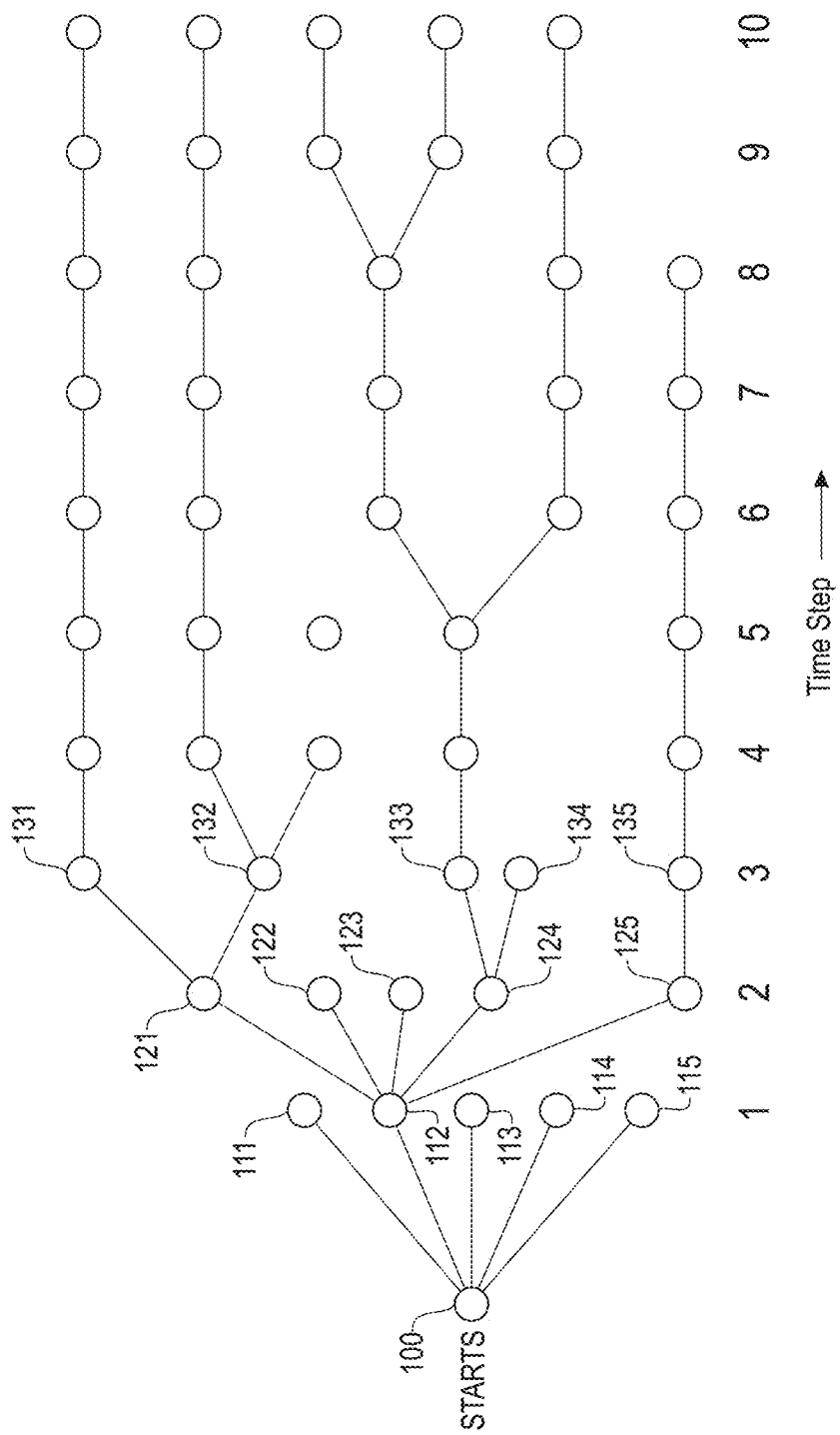
FIG. 1 is an illustrative example of predicting translation of a source sentence using a beam search algorithm with a static beam width B of 5 which selects the best 5 words at each time step, in accordance with the prior art.

In Natural Language Processing (NLP) for language-to-language machine translation tasks, the language-to-language machine translation starts with a source sentence in a source language and outputs a translation of the source sentence in a target language, using a sequence-to-sequence model that employs an encoder and a decoder framework in conjunction with deep learning using basic blocks such as Long Short-Term Memory (LSTM) or Gated Recurrent Unit (GRU).

The source sentence is configured as a source sequence of words. The encoder maps the source sequence of words, encodes source information in the source sequence, and passes the encoded source sequence to the decoder. The initial input to the decoder includes the encoded source sequence from the encoder along with the start-of-string <START> token to produce an output sequence of words in the target language as the translated source sentence.

Different algorithms have been used to achieve a good translation of the source sentence in the source language by applying a conditional probability algorithm to the source sentence in an iterative process where each iteration is called a time step. At each time step, one or more most likely target words are selected based on conditional probabilities using the target words selected at the previous time steps. Such algorithms include a Greedy Search Algorithm and a Beam Search Algorithm.

The Greedy Search Algorithm selects one best candidate as an input sequence for each time step. Choosing just one best candidate might be suitable for a current time step, but the choice is likely to be sub-optimal for translating the full source sentence.

The beam search algorithm selects multiple alternatives for words of the source sequence at each time step based on conditional probability. The number of multiple alternatives of words at each time step depends on a static beam width B. At each time step, the beam search selects B number of best alternative words with the highest probability as the most likely possible choices of words for the time step. B may be a learnable hyper-parameter which is learned for each model based on the accuracy of results, and the best beam with B is selected which has a highest accuracy of predicted sentences. The special case of B=1 is the Greedy Search Algorithm.

The static beam width B is defined as the fixed number of best alternative words having the highest probability chosen in each time step.

The following steps are for an example of how to perform a beam search with static beam width B=3, for a given input source sentence S of n words in the source language (e.g., Greek), wherein the beam search results in a translation of the source sentence S to an output sequence of target words in the target language (e.g., English) as the translated source sentence. The vocabulary of the target language contains multiple words (e.g., 10,000 words in this example).

In Step 1, for the given source sentence S provided as input to the encoder with B=3, the beam search finds the best 3 target words with the highest probability using a softmax function in the decoder, which outputs 10,000 different probabilities of target words being a translation of the first word in the source sentence S. The selected number of most probable words is 3 words, since B=3.

The following softmax function is a function of a sequence of n real numbers $Z_1, Z_2, \ldots Z_n$ that generates an output sequence of real numbers $R_1, R_2, \ldots R_n$ each between 0 and 1, wherein a summation of the real numbers $R_1, R_2, \ldots R_n$ in the output sequence is 1, so that the real numbers $R_1, R_2, \ldots R_n$ in the output sequence may be interpreted as normalized probabilities:

$$R_i = \text{softmax}(Z_i) = \frac{\exp(Z_i)}{\sum_{j=1}^{n} \exp(Z_j)} \quad (1)$$

Step 2 selects the three best sequences of target words, based on conditional probability, for target word translations of the first and second source words in the input source sentence S, given the selected first word.

Step 3 selects the three best sequences of target words, based on conditional probability, for target word translations of the first, second and third source words in the input source sentence S, given the selected first and the second words.

The process is continued and the decoder outputs one or more translated sentences having the highest conditional probability after all words of the input source sentence have been translated. The best one or more translated sentences can vary in length or may be the same length. A final step selects, from the one or more translated sentences, the translated sentence with the highest conditional probability.

FIG. 1 is an illustrative example of predicting translation of a source sentence using a beam search algorithm with a static beam width B of 5 which selects the best 5 words at each time step, in accordance with the prior art. Ten (10) time steps are depicted in a horizontal direction as positive integers 1, 2, . . . , 10 and continue beyond time step 10 assuming that the total number of time steps exceed 10 time steps. The total number of time steps is equal to the total number of words in the source sentence.

FIG. 1 depicts the best 5 words selected in time step 1, based on conditional probability applied to the output sequence of words generated by the decoder. The best 5 words selected in time step 1 includes words 111, 112, 113, 114 and 115.

FIG. 1 depicts the best 5 best words selected at time step 2 that continue the sentence from word 112, and likewise continue the sentence from each of the 4 remaining words 111, 113, 114, and 115 selected in time step 1. The sequences that continue the sentence from each of the 4 remaining words 111, 113, 114 and 115 selected in time step 1 are not shown in FIG. 1. The 5 best words selected in time step 2 are selected based on conditional probability with word 112 as the first word of the translated sentence for each of the 5 sequences existing in time step 2. The best 5 words selected in time step 2 include words 121, 122, 123, 124, and 125.

FIG. 1 depicts the best 5 best words in time step 3 that continue the sentence from words 112 and 121 in a first sequence, words 112 and 124 in a second sequence, and words 112 and 125 in a third sequence, and likewise continue the sentence from each of the 2 remaining words 122 and 123 selected in time step 2. The sequences that that continue the sentence from each of the 2 remaining words 122 and 123 selected in time step 2 are not shown in FIG. 1. The 5 best words 130 selected in time step 3 are selected based on conditional probability with: words 112 and 121 as the first two words of the translated sentence for the first sequence, words 112 and 122 as the first two words of the translated sentence for the second sequence, words 112 and 123 as the first two words of the translated sentence for the third sequence, words 112 and 124 as the first two words of the translated sentence for a fourth sequence, and words 112 and 125 as the first two words of the translated sentence for a fifth sequence. The best 5 words selected in time step 3 include words 131, 132, 133, 134, and 135.

Time steps 4-10 are processed in a manner similar to the processing of time steps 1-3, and continue with additional time steps until all words of the source sentence have been translated and five translated sentences have been provided as output from the decoder. A final step selects, from the five translated sentences, the translated sentence with the highest conditional probability.

The static beam width B has disadvantages.

If, in the example in FIG. 1, a smaller beam width B than 5 is selected, the translation is faster with efficient use of memory and computational power but is unlikely to be the most likely translated sentence due to the static nature of the beam width B. For example, the following sentences might result from the beam search with B=1, 2, 3, and 4:

B=1: Aaron skips his breakfast
B=2: Aaron evades his breakfast
B=3: Aaron misses his breakfast
B=4: Aaron avoids his breakfast If B=4 provides the most likely translation, then use of B=3 will not provide the most likely translation.

If a larger beam width B than 4 is selected, the translation quality is better, but unnecessary computations leading to more memory utilization are likely, which leads to unnecessary validations of the other less likely sentences along with the most likely sentences due to the static beam width.

For example, if a larger beam width of B=6 is selected, the most likely translations to the input sentences could have been encountered at B=4, but due to the static nature of the beam width of 6, unnecessary computations are performed and memory is overutilized.

Thus, selection of a static beam width forces the same beam width to be used for each source word in the source sentence. For example, at time step i, there might be 4 accurate translations but the static beam width of 3 might result in omitting the fourth prediction which is an information loss, and at time step i+2, there might be 2 accurate translations but since the static beam width is 3, the beam search might select a third translations which is inaccurate, which would result in adding entropy and cause consequent loss of efficiency.

Embodiments of the present invention use a dynamic beam search algorithm, with a dynamic beam width B, that selects multiple alternatives for an input sequence at each time step based on conditional probability.

The dynamic beam width B is defined as the variable number of best alternative words (with the highest probability) chosen in each time step; i.e., B may vary from time step to time step.

At each time step, the beam search determines a dynamic beam width B that is specific to the time step and is determined, based on probability differences, via a fully connected neural network (FCNN), which results in a selection of the B number of best alternatives with the highest probability of being translations of source word for the time step.

Thus in each current time step, the beam search computes the dynamic beam width B as a value that is specific to the current time step based on probability differences in probabilities of the source word being translated, in the current time step, into different words in the target language, which results in a best choice of B for the current time step.

Embodiments of the present invention use the fully connected neural network (FCNN) to compute the dynamic beam width B as an integral part of a NLP model with hyper parameters learned during a training based on the input sentence to be translated and the probabilities of the output translated word, so that the dynamic beam width B increases and decreases dynamically based on a context of the sentence being translated. A layer of the FCNN used in the computation of B can be independently learned and transferred into sequence modelling stages.

Use of the dynamic beam width overcomes the problems inherent to a static beam width of inferior quality translation and extra unnecessary computation.

With the dynamic beam width, the probability of a source word being translated into a target word of the target might be very low in a time step. In the next time step, however, the same target word might increase the overall probability.

The process of translating the source sentence containing n source words is an iterative process having n iterations. Each iteration is a time step. Thus, "iteration" and "time step" have a same meaning and may are used interchangeably herein. Further, the word "iteration" for the process for translating the source sentence is also called a "translation iteration".

Figure 2:
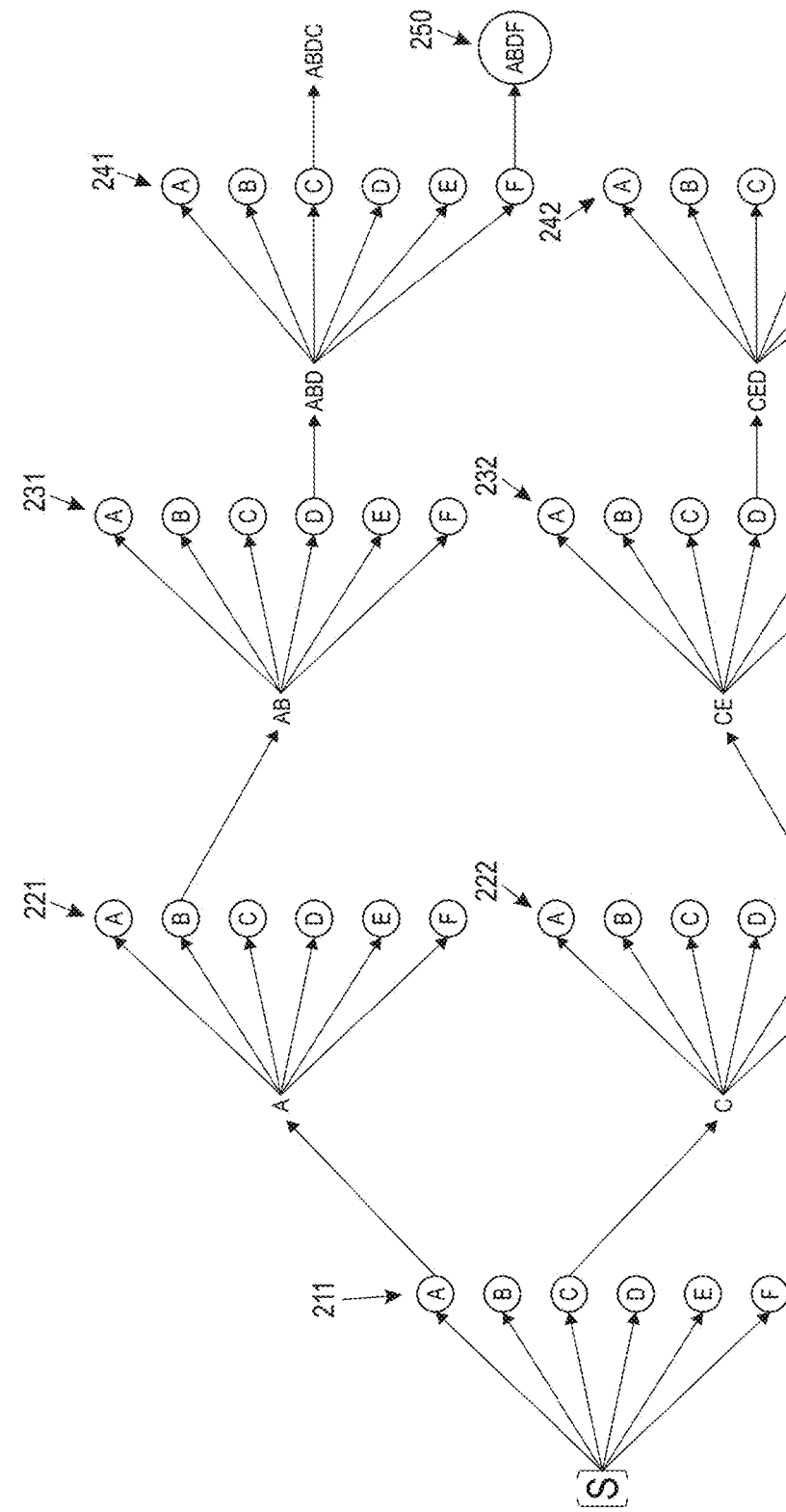
FIG. 2 depicts an illustrative example of translating a source sentence in a source language into a translated sentence in a target language using a static beam width, in accordance with the prior art.

FIG. 2 depicts an illustrative example of translating a source sentence S in a source language into a translated sentence T in a target language using a static beam width, in accordance with the prior art.

The source sentence S is a sequence of n source words a, b, c, d (n=4). The vocabulary of the target language is a sequence of m vocabulary words A, B, C, D, E, F (m=6).

The total number iterations n is 4. Most probable target words for source words a, b, c, d are determined in iterations 1, 2, 3, 4, respectively.

Each iteration of iterations 1, 2, 3, and 4 determines target words selected from the vocabulary of the target language by generating and processing J probability vectors in each iteration and using a static beam width B.

B=2 in iteration 1, 2, and 3, but B=1 in the last iteration 4.

J=B=2 in iterations 2, 3, and 4, but J=1 in the first iteration 1.

Each probability vector is a vector of conditional probabilities of using vocabulary words A, B, C, D, E, F to translate source words a, b, c, d in iterations 1, 2, 3, 4, respectively.

Each probability vector is generated in a current iteration by executing a sequence-to-sequence algorithm (e.g., LSTM or GRU) using the source sentence S and target vectors generated in the previous iteration.

Iteration 1 generates and processes probability vector 211 (J=1), and then selects, in accordance with B=2, two target words A and C being the 2 most probable target word translations of source word a. Next, iteration 1 generates two target vectors A and C.

Iteration 2 generates and processes J probability vectors 221 and 222 (J=2) from target vectors A and C, respectively, and then selects, from probability vectors 221 and 222 in accordance with B=2, two target words B and E as being the 2 most probable target word translations of source word b that continue target vectors A and/or C generated in iteration 1. Next, iteration 2 generates two target vectors AB and CE.

Iteration 3 generates and processes J probability vectors 231 and 232 (J=2) from target vectors AB and CE, respectively, and then selects, from probability vectors 231 and 232, two target words D and D as being the 2 most probable target word translations of source word c that continue the target vectors AB and/or CE generated in iteration 2. Next, iteration 3 generates two target vectors ABD and CED.

Iteration 4 generates and processes J probability vectors 241 and 242 (J=2) from target vectors ABD and CED, respectively, and then selects, from probability vectors 241 and 242, two target words C and F as being the 2 most probable target word translations of source word d that continue target vectors ABD and/or CED generated in iteration 3. Next, iteration 4 generates two target vectors ABDC and ABDF. Next, iteration 4 selects ABDF as the most probable target vector translation, selected from target vectors ABDC and ABDF, of the source sentence S into the target language.

Figure 3:
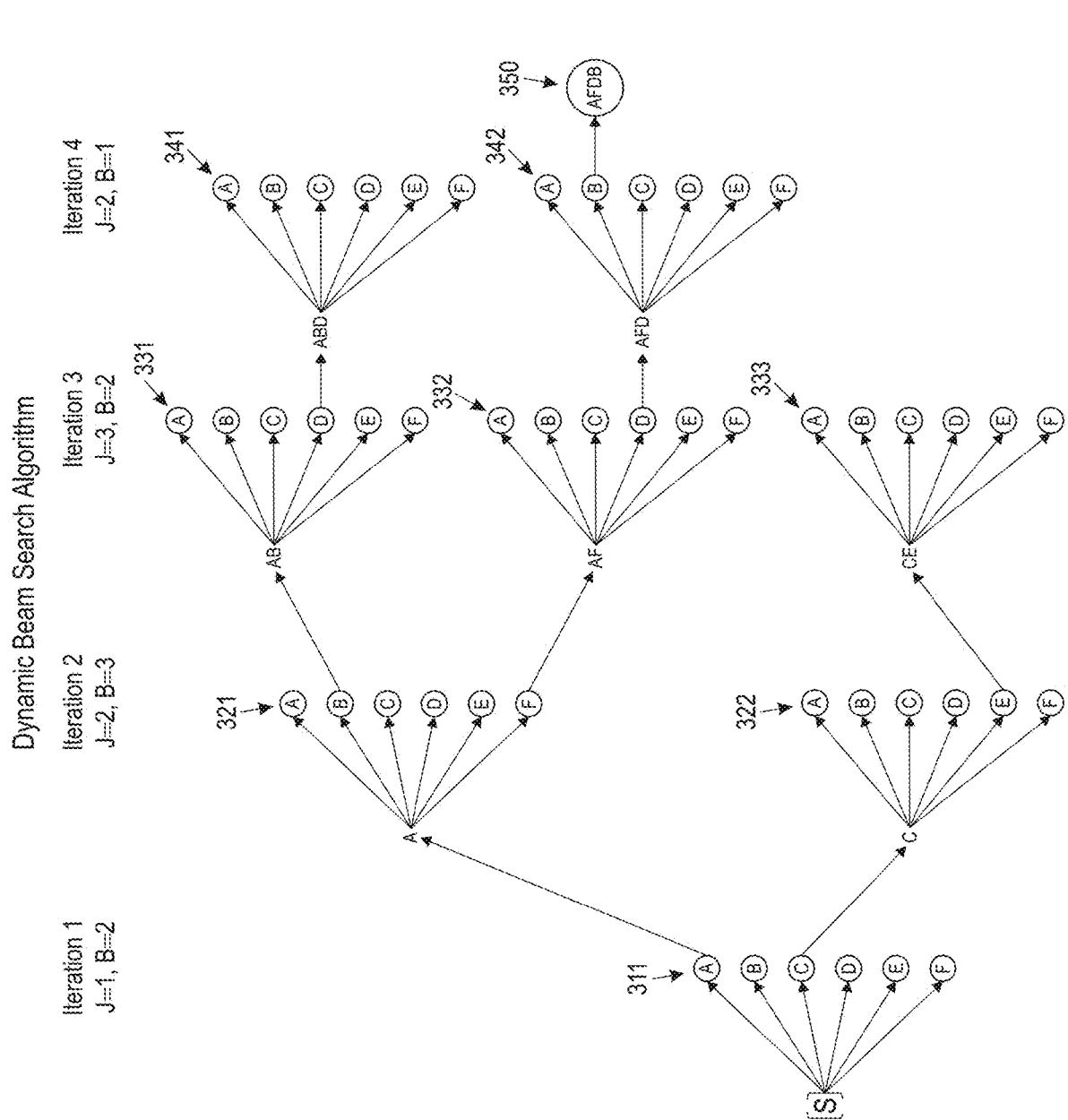
FIG. 3 depicts an illustrative example of translating a source sentence in a source language into a translated sentence in a target language using a dynamic beam width, in accordance with embodiments of the present invention.

FIG. 3 depicts an illustrative example of translating a source sentence S in a source language into a translated sentence T in a target language using a dynamic beam width, in accordance with embodiments of the present invention.

The source sentence S is a sequence of n source words a, b, c, d (n=4). The vocabulary of the target language is a sequence of m vocabulary words A, B, C, D, E, F (m=6).

The total number iterations n is 4. Most probable target words for source words a, b, c, d are determined in iterations 1, 2, 3, 4, respectively.

Each iteration i of iterations 1, 2, 3, and 4 determines target words selected from the vocabulary of the target language by generating and processing $J_i$ probability vectors and using a dynamic beam width $B_i$ (i=1, 2, 3, 4).

$B_i$ is dynamically determined in each iteration 1, 2, and 3 by executing a FCNN algorithm that utilizes a probability difference vector derived from the probability vectors, and $B_4$ equals a specified positive integer q for iteration 4. In this example, $B_4$=1.

$J_1$=1 in iteration 1, and $J_i$=$B_{i-1}$ for iteration i=2, 3, and 4.

Each probability vector is a vector of conditional probabilities of using vocabulary words A, B, C, D, E, F to translate source words a, b, c, d in iterations 1, 2, 3, 4, respectively.

Each probability vector is generated in a current iteration by executing a sequence-to-sequence algorithm (e.g., LSTM or GRU) using S and target vectors generated in the previous iteration.

Iteration 1 generates and processes $J_1$ probability vectors 311 ($J_1$=1), and then determines $B_1$=2 via FCNN and then selects, in accordance with $B_1$=2, two target words A and C being the 2 most probable target word translations of source word a. Next, iteration 1 generates two target vectors A and C and also computes $J_2$=$B_1$=2.

Iteration 2 generates and processes $J_2$ probability vectors 321 and 322 ($J_2$=2) from target vectors A and C, respectively, and then determines $B_2$=3 via FCNN, and then selects, from probability vectors 321 and 322 in accordance with $B_2$=3, three target words B, F and E as being the 3 most probable target word translations of source word b that continue target vectors A and/or C generated in iteration 1. Next, iteration 2 generates three target vectors AB, AF and CE and also computes $J_3$=$B_2$=3.

Iteration 3 generates and processes $J_3$ probability vectors 331, 332 and 333 ($J_3$=3) from target vectors AB, AF and CE, respectively, and then determines $B_3$=2 via FCNN, and then selects, from probability vectors 331, 332 and 333 in accordance with $B_3$=2, two target words D and D as being the 2 most probable target word translations of source word c that continue the target vectors AB, AF and/or CE generated in iteration 2. Next, iteration 3 generates two target vectors ABD and AFD and also computes $J_4$=$B_3$=2.

Iteration 4 generates and processes $J_4$ probability vectors 341 and 342 ($J_4$=2) from target vectors ABD and AFD, respectively, and then due to $B_4$=1 as specified, selects from probability vectors 341 and 342, one target word B as being the most probable target word translation of source word d that continues target vectors ABD and/or AFD generated in iteration 3. Next, iteration 4 generates target vector AFDB as the most probable target vector translation of the source sentence S into the target language.

Figure 4:
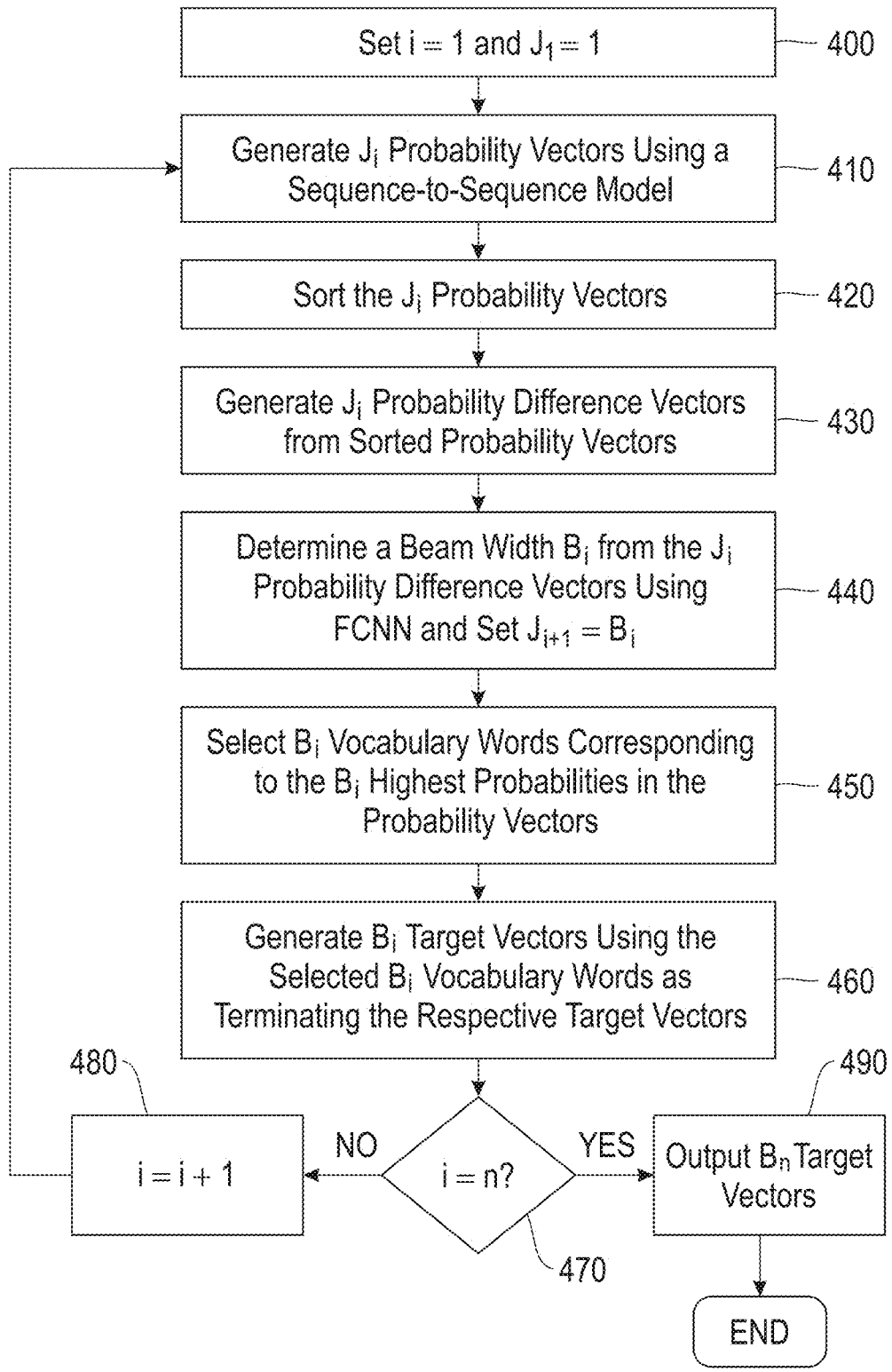
FIG. 4 is a flow chart depicting a method for translating, using a beam search, a source sentence configured in a source language into a target sentence configured in a target language, in accordance with embodiments of the present invention.

FIG. 4 is a flow chart depicting a method, using a beam search, for translating a source sentence S configured in a source language into a target sentence T configured in a target language, in accordance with embodiments of the present invention. The sentence S in the source language comprises n source words $S_1, \ldots, S_n$. The target language has a vocabulary characterized by a vocabulary vector V of m vocabulary words denoted as $V_1, \ldots, V_m$, wherein n≥2 and m≥3.

A word may be a single word or a group of connected words defined as a word by delimiters such as parentheses ( ). Thus, (San Francisco) denotes the word "San Francisco".

The flow chart of FIG. 4 includes steps 400-490. Steps 410-480 is a loop describing each iteration of an iterative process having no more than n iterations. Step 400 initializes the loop and step 490 is performed after the iterative process has finished.

Step 400 initializes an iteration index i to 1 and initializes a number $J_1$ of probability vectors in iteration 1 to 1. The loop of steps 410-480 describe iteration i (i=1, ..., n)

Figure 5:
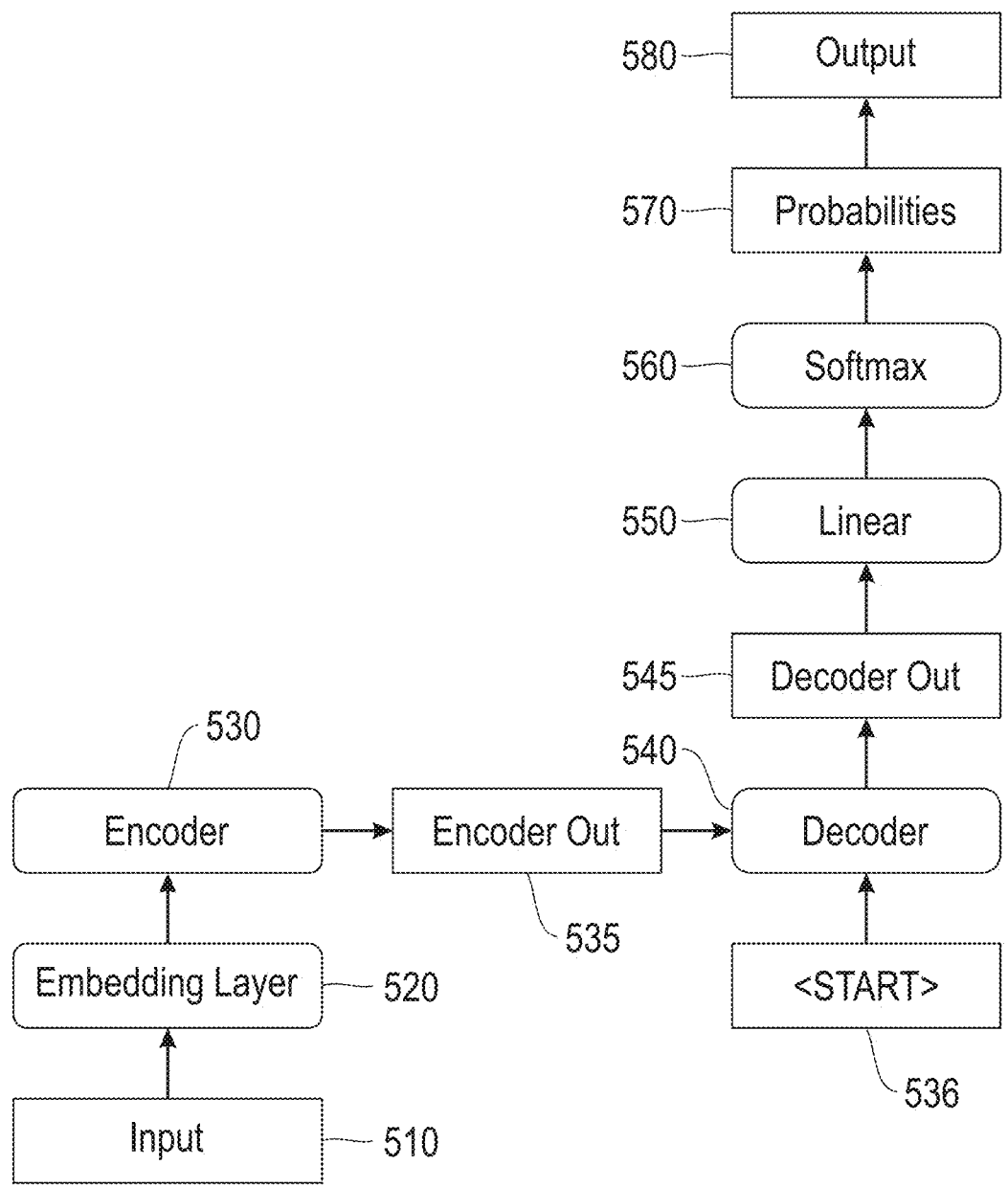
FIG. 5 describes how each probability vector is generated in a step of FIG. 4 using a sequence-to-sequence model, in accordance with embodiments of the present invention.

Step 410 generates, using a sequence-to-sequence model, $J_i$ probability vectors $P_{ij}$ (j=1, 2, ..., $J_i$). Each probability vector $P_{ij}$ has m elements $P_{ijk}$ (k=1, 2, ..., m). Each element $P_{ijk}$ of the probability vector $P_{ij}$ is a conditional probability of a respective vocabulary word $V_k$ being a translation of the source word $S_i$. For i>1, the vocabulary word $V_k$ (k= 1, 2, ..., m) terminates a target vector of vocabulary words selected in iteration i−1. FIG. 5 describes how each probability vector is generated using the sequence-to-sequence model.

Step 420 sorts each probability vector $P_{ij}$ (j=1, 2, ..., Ji) in descending order or ascending order of the elements in each probability vector $P_{ij}$.

Step 430 generates $J_i$ probability difference vectors respectively corresponding to the Ji sorted probability vectors. Each element of each probability difference vector is a numerical difference between respective adjacent elements in the respective sorted probability vector.

Figure 6:
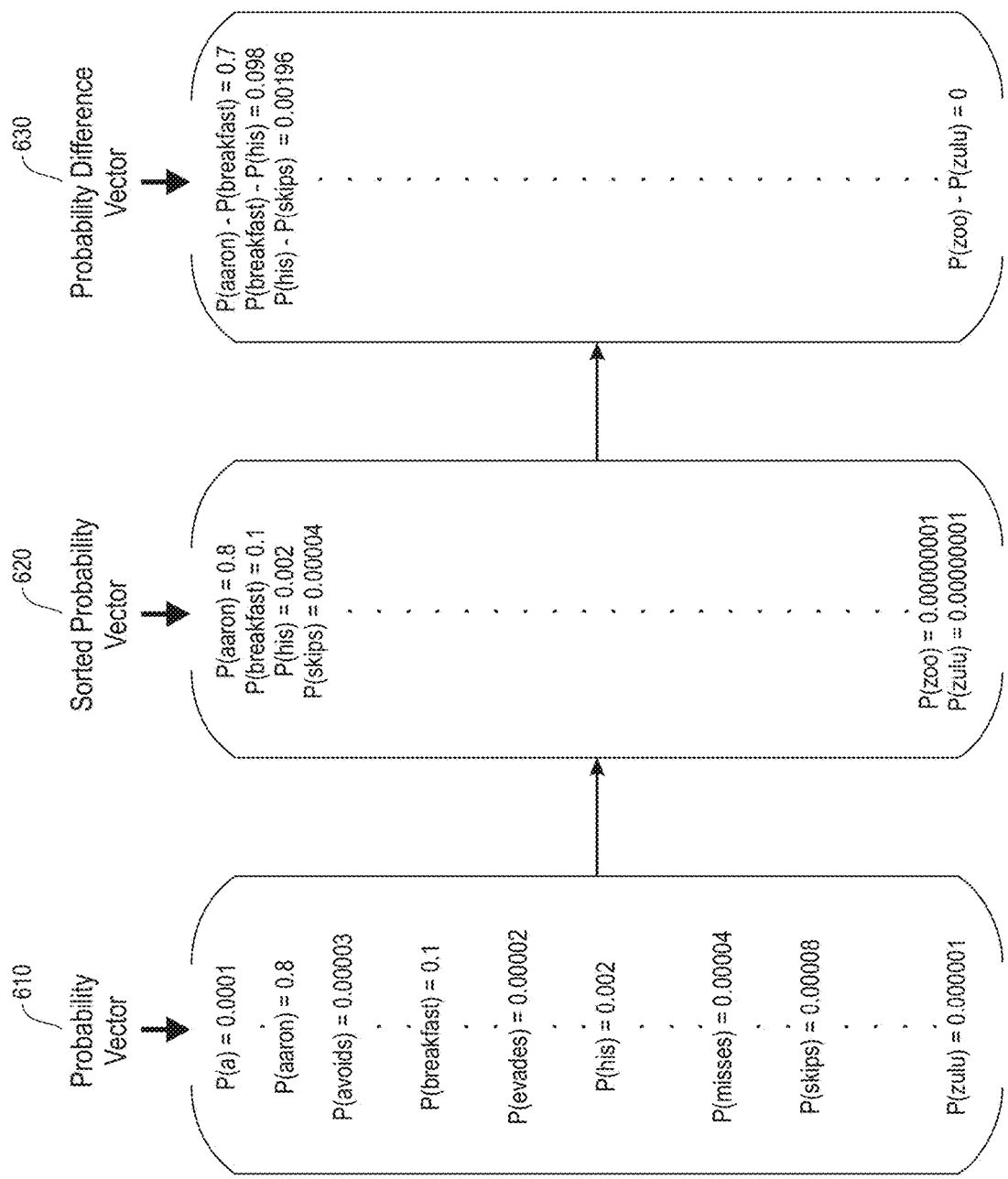
FIG. 6 depicts of an example of generating a probability difference vector from a probability vector, illustrating steps in FIG. 4, in accordance with embodiments of the present invention.

An example of generating a probability difference vector from a probability vector, illustrating steps 420 and 430, is provided in FIG. 6.

Figure 7A:
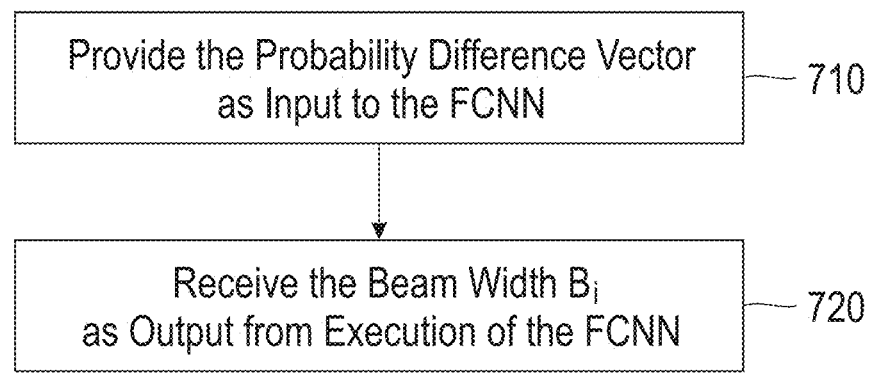
FIGS. 7A-7C are flow charts describing different ways of using the probability difference vectors to determine the beam width in a step of FIG. 4, in accordance with embodiments of the present invention.
Figure 7B:
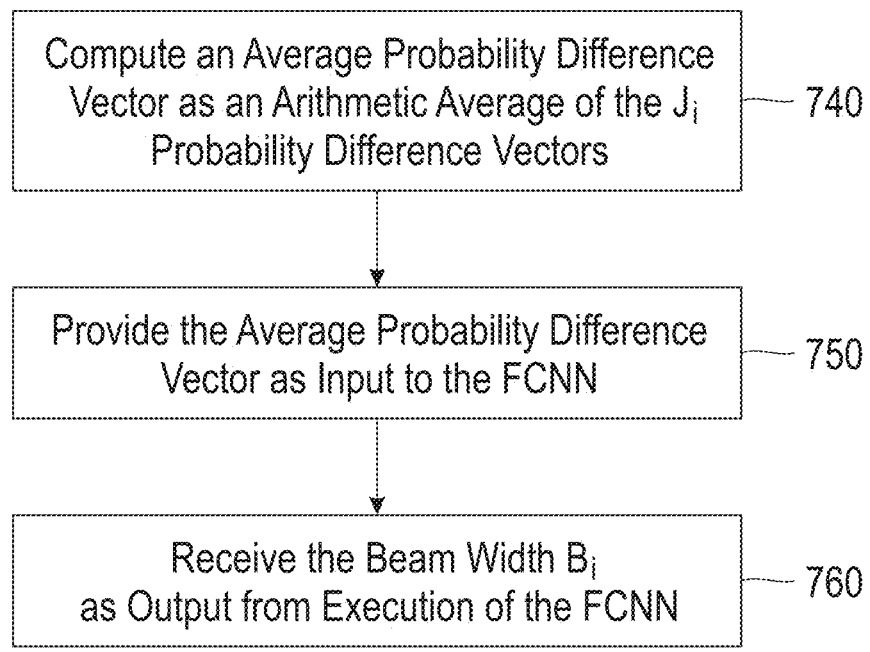
Figure 7C:
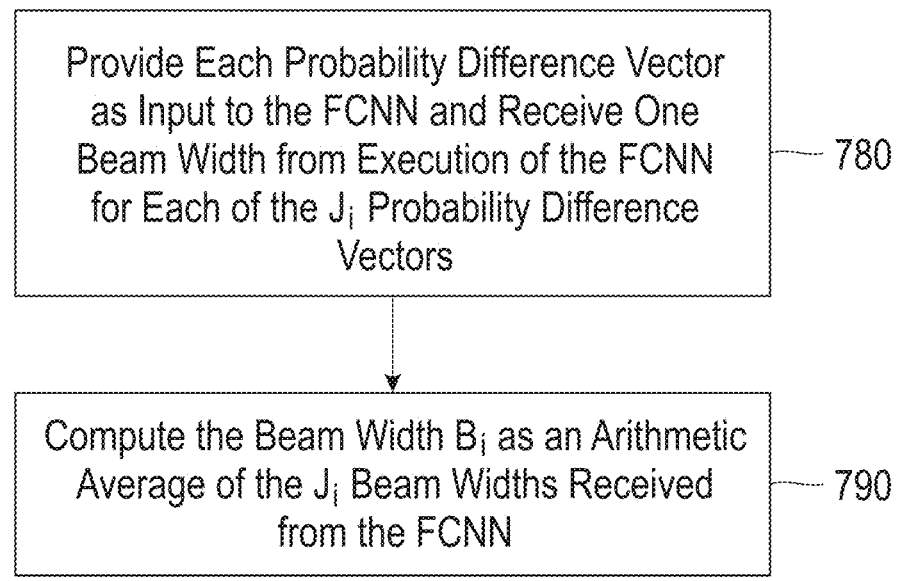
Figure 8:
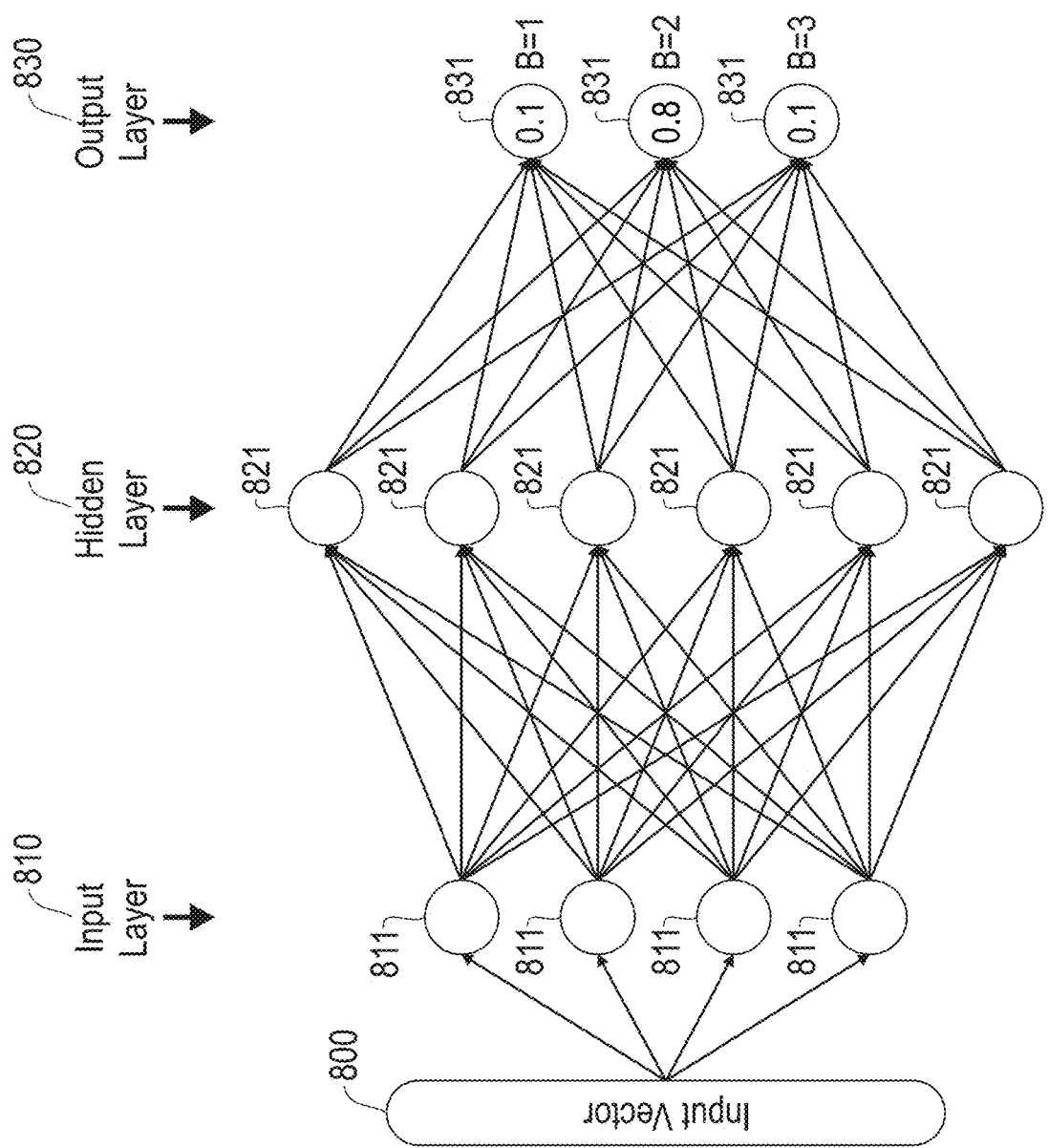
FIG. 8 depicts a fully connected neural network (FCNN) used to determine the beam width in a step of FIG. 4, in accordance with embodiments of the present invention.

If i<n, step 440 determines, using the $J_i$ probability difference vectors, a beam width $B_i$ via execution of a fully connected neural network (FCNN) and computes $J_{i+1}$ as equal to $B_i$. FIGS. 7A-7C are flow charts describing different ways of using the $J_i$ probability difference vectors to determine the beam width $B_i$ in step 440. FIG. 8 depicts a fully connected neural network (FCNN) used to determine the beam width $B_i$ If i=n, step 440 sets the beam width $B_n$ equal q, wherein q is a specified positive integer subject to 1≤q≤n. The beam width $B_n$, which is equal to q, is the number of best translated sentences that are outputted in step 490. In one embodiment q is encoded within executable program code that implements embodiments of the present invention. In one embodiment, q is obtained from user input such as from a user's response to a prompt for q on a display of a computer system. In the special case of q=1, only the best translated sentence is outputted in step 490.

In one embodiment, if two or more translated sentences have a same highest probability, then in one embodiment, one translated sentence is randomly selected from the two or more translated sentences as having the highest conditional probability.

Step 450 selects $B_i$ vocabulary words corresponding to the $B_i$ highest conditional probabilities in the $J_i$ probability vectors $P_{ij}$ (j=1, 2, ..., $J_i$).

If a plurality of vocabulary words correspond to equal conditional probabilities in the $J_i$ probability vectors and thereby create a conflict by not permitting a definitive selection of the $B_i$ vocabulary words corresponding to the $B_i$ highest conditional probabilities, then the conflict is resolved in step 450 by a random selection of vocabulary words from the plurality of vocabulary words.

For example, if $B_i$=1 and two vocabulary words correspond to equal highest conditional probabilities in the $J_i$ probability vectors, then step 450 randomly selects one of the two vocabulary words as the vocabulary word corresponding to the highest probability in the $J_i$ probability vectors.

As another example, if $B_i$=2 and three vocabulary words correspond to equal second highest conditional probabilities in the $J_i$ probability vectors, then step 450 randomly selects one of the three vocabulary words as the vocabulary word corresponding to the second highest probability in the $J_i$ probability vectors.

If i=1, step 460 generates $B_i$ target vectors respectively comprising in the selected $B_i$ vocabulary words.

If i>1, step 460 generates the $B_i$ target vectors by adding each of the selected $B_i$ vocabulary words to the end of respective target vectors generated in iteration i−1

Each target vector generated in step 460 in iteration i has a translation probability equal to the conditional probability of the selected vocabulary word at the end of the target vector. For example, the translation probability of the target vector AFD in iteration 3 in FIG. 3 is the conditional probability of the vocabulary word D in probability vector 332. As another example, the translation probability of the target vector AFDB in iteration 4 in FIG. 3 is the conditional probability of the vocabulary word B in probability vector 342.

Step 470 determines whether a stop condition of i=n is satisfied. If the stop condition is not satisfied, step 480 increments i by 1 and loops back to step 410 to perform the next iteration i. If the stop condition is satisfied, step 490 outputs the $B_n$ target vectors, wherein each target vector of the $B_n$ target vectors is a translation of the sentence S in the target language. In one embodiment, the translation probability of each outputted target vector is also outputted in step 470. Any computerized form of outputting is within the scope of step 490 (e.g., printing by a printer, displaying on a display device, transmitting to another computer, etc.)

In one embodiment, the iterative process can be stopped at the end of any iteration i in which the highest probability target vector generated in iteration i has a translation probability of at least a specified threshold probability. In this embodiment, the Yes branch from step 440 is activated by either satisfaction of a first stop condition of i=n or a second stop condition of a highest probability target vector generated in iteration i having a translation probability of at least a specified threshold probability.

The probability vectors in iteration i (i=1, 2, . . . , n) are conditional probability vectors of a form P(A|B) where P is a probability of A under a condition B.

In iteration 1, the generated probability vector is $P(y^1|x)$ for vocabulary words $y^1$ into which source word $S_1$ may be translated and x denotes the source sentence S.

In iteration 2, each generated probability vector is $P(y^1, y^2|x)$ for vocabulary words $y^2$ into which source word $S_2$ may be translated given $P(y^1|x)$ and a probability $P(y^2|x, y^1)$ of occurrence of $y^2$ given that a target vector terminating in $y^1$ has been established where $$P(y^1,y^2|x)=P(y^1|x)*P(y^2|x,y^1) \quad (2)$$

In iteration 3, each generated probability vector is $P(y^1, y^2, y^3|x)$ for vocabulary words $y^3$ into which source word $S_3$ may be translated, where $$P(y^1,y^2,y^3|x)=p(y^1|x)*P(y^2|x,y^1)*P(y^3|x,y^1,y^2) \quad (3)$$

In iteration i, each generated probability vector is $P(y^1, y^2, \ldots y^i|x)$ for vocabulary words $y^3$ into which source word $S_3$ may be translated, where $$P(y^1,y^2, \ldots y^i|x)=P(y^1|x)*P(y^2|x,y^1)* \ldots *P(y^i|x,y^1, y^2, \ldots y^{i-1}) \quad (4)$$

Equations (2)-(4) express each probability vector as being generated as a product of previously generated probability vectors. However, many of the generated probabilities are small floating-point numbers and multiplying small floating-point numbers together creates very small numbers. In one embodiment, in order to avoid underflowing the floating-point numbers, the natural logarithm of the generated probabilities are added together instead of multiplying the generated probabilities.

FIG. 5 describes how each probability vector is generated in step 410 of FIG. 4 using a sequence-to-sequence model, in accordance with embodiments of the present invention.

The sequence-to-sequence model uses an encoder and decoder framework with Long Short Term Memory (LSTM) or Gated Recurrent Unit (GRU) as the basic blocks. The sequence-to-sequence model uses text comprising a vocabulary of words in the source and target languages.

The sequence-to-sequence model takes the source sentence S as input 510 and passes the input 510 through an Embedding layer 520 and then into an Encoder 530. The Encoder 530 outputs an encoded representation 535 that compactly captures the essential features of the input 510.

The output representation 535 is fed to a Decoder 540 along with a "<START>" token 540 to seed output from the Decoder 540. The Decoder 540 uses the encoded representation 535 and the "<START>" token 540 to generate output 545 which is an encoded representation of the sentence S in the target language.

The output 545 is then passed through an output layer, which may include Linear layers 550 followed by a Softmax 560. The Linear layers 550 outputs a score of the likelihood of occurrence of each word in the vocabulary at each position in the output sequence. The Softmax 560 then converts the scores into probabilities 570 from which an output 580 is generated.

FIG. 6 depicts of an example of generating a probability difference vector 630 from a probability vector 610, illustrating steps 420 and 430 in FIG. 4, in accordance with embodiments of the present invention.

The probability vector 610 is sorted in descending order of probability (step 420 of FIG. 4) as shown in the sorted probability vector 620.

Numerical probability differences between adjacent elements in the sorted probability vector 620 are used to generate the probability difference vector 630 (step 430 of FIG. 4) as shown in the probability difference vector 630.

FIGS. 7A-7C are flow charts describing different ways of using the $J_i$ probability difference vectors to determine the beam width $B_i$ in step 440 of FIG. 4. in accordance with embodiments of the present invention.

In FIG. 7A, the beam width Bi is determined under a constraint of $J_i=1$, where $J_i$ is the number of probability vectors generated in iteration i in step 410 of FIG. 4. The flow chart of FIG. 7A includes steps 710-720.

Step 710 provides the probability difference vector as input to the FCNN.

Step 720 receives the beam width $B_i$ as output from execution of the FCNN.

In FIG. 7B, the beam width $B_i$ is determined under a constraint of $J_i \geq 2$, where $J_i$ is the number of probability vectors generated in iteration i in step 410 step of FIG. 4. The flow chart of FIG. 7B includes steps 740-760.

Step 740 computes an average probability difference vector as an arithmetic average of the $J_i$ probability difference vectors.

Step 750 provides the average probability difference vector as input to the FCNN.

Step 760 receives the beam width $B_i$ as output from execution of the FCNN.

In FIG. 7C, the beam width $B_i$ is determined under a constraint of $J_i \geq 2$, where $J_i$ is the number of probability vectors generated in iteration i in step 410 of FIG. 4. The flow chart of FIG. 7C includes steps 780-790.

Step 780 provides each probability difference vector as input to the FCNN and receives one beam width from execution of the FCNN for each of the $J_i$ probability difference vector, which results in $J_i$ beam widths from $J_i$ respective executions of the FCNN respectively corresponding to the $J_i$ probability difference vectors.

Step 790 computes the beam width $B_i$ as an arithmetic average of the $J_i$ beam widths received from the $J_i$ executions of the FCNN. If the computed $B_i$ has a decimal part unequal to 0.5 then the computed $B_i$ is rounded to a nearest integer. If computed $B_i$ has a decimal part equal to 0.5 then the computed $B_i$ is rounded upward to a next integer.

Thus in step 790, a computed $B_i$ of 3.0 is rounded to 3, a computed $B_i$ of 3.25 is rounded to 3, a computed $B_i$ of 3.5 is rounded to 4, and a computed $B_i$ of 3.75 is rounded to 4.

FIG. 8 depicts a fully connected neural network (FCNN) used to determine the beam width $B_i$ in step 440 of FIG. 4, in accordance with embodiments of the present invention.

The layers in the FCNN include an input layer 810 comprising nodes 811, one or more hidden layers 820 comprising nodes 821, and an output layer 830 comprising nodes 831. The nodes 811, 821, and 831 are also called neurons.

An input vector 800 provides input to the nodes 811 of the input layer 810. The input vector 800 is a probability difference vector which is either one of the $J_i$ probability difference vectors generated in step 430 of FIG. 3 (see FIGS. 7A and 7C) or an arithmetic average of the $J_i$ probability difference vectors (See FIG. 7B). FIG. 6 depicts an exemplary difference vector 630.

Each node 831 of the output layer 830 is associated with a different beam width and includes a probability of the respective beam width B being the best beam width for iteration i.

The input vector 800 provides the $J_i$ probability difference vectors, generated in iteration i in step 430 of FIG. 3, to the nodes 811 of the input vector 810. The input probability difference vectors are generated in iteration i in step 430 of FIG. 4 and are illustrated as probability difference vector 630 in FIG. 6.

Each node of the output layer is associated with a different beam width B and includes a probability, expressed as a fraction between 0 and 1, of being a best beam width. The Softmax function is applied to output from the one or more hidden layers 820 to ensure that the probabilities in the nodes of the output layer 830 are in a range of 0 to 1 and that a summation over the probabilities in the nodes of the output layer 830 is 1.

The value of beam width B outputted by the FCNN is the beam width having the highest probability in the nodes of the output layer 830. If two or more nodes in the output layer 830 have a same highest probability, then a node is randomly selected from the two or more nodes in the output layer and the beam width B outputted by the FCNN is the beam width associated with the randomly selected node.

For illustrative purposes only, the three nodes 831 of the output layer 830 are associated with beam widths 1, 2 and 3 and include probabilities 0.1, 0.8, and 0.1, respectively. The FCNN outputs B=2 which includes the highest probability 0.8.

In a fully connected neural network, there is a weight between each pair of connected nodes. For example, if the one or more hidden layers 820 consists of a single hidden layer and if the input layer 810, the hidden layer 820 and output layer 830 has 4 nodes, 6 nodes and 3 nodes, respectively, as depicted in FIG. 8, there are 24 weights (4×6) between the input layer 810 and the hidden layer 820 and 18 weights (6×3) between the hidden layer 820 and the output layer 830.

In addition, each node of the one or more hidden layers 820 has a bias.

For a given node of the first hidden layer, a summation over weighted values of the input nodes that are connected to the given node of the first hidden layer is computed, using the weights between the given node of the first hidden layer and the values of the input nodes that are connected to the given node of the first hidden layer. The computed summation is incremented by the bias of the given node of the first hidden layer. The incremented summation is fed into an activation function (e.g., sigmoid function, hyperbolic tangent function, rectified linear function, etc.) and the output from the activation function becomes the value of the given node of the first hidden layer. The preceding process is repeated for all other nodes of the first hidden layer.

If the one or more hidden layers 820 consist of a plurality of hidden layers, the preceding process is sequentially repeated between the successive layers in each pair of successive layers of the plurality of hidden layers until all nodes in the hidden layers 820 contain values.

The preceding process is repeated between the last hidden layer 820 and the output layer 830 until all nodes in the output layer 830 contain values.

Training data is used to train the FCNN to predict the best beam width in each translation iteration. Training the FCNN with the training data is an iterative process in which the weights are selected randomly initially and the biases are set to zero initially. The weights and biases are changed in successive training iterations in a manner that successively reduces a loss function with respect to variations between the predicted best beam width and the actual beam width. The training data includes instances of source statements for which the translation accuracy for different beam widths at each iteration of the source sentence translation process is known.

In one embodiment, the final weights and biases generated in the FCNN training enables a prediction, by the FCNN, of a smallest beam width in each translation iteration whose translation accuracy would not increase by more than a specified accuracy threshold for beam widths higher than the smallest beam width. Use of the preceding smallest beam width in each translation iteration prevents an unnecessary increase in computation time and memory utilization.

Figure 9:
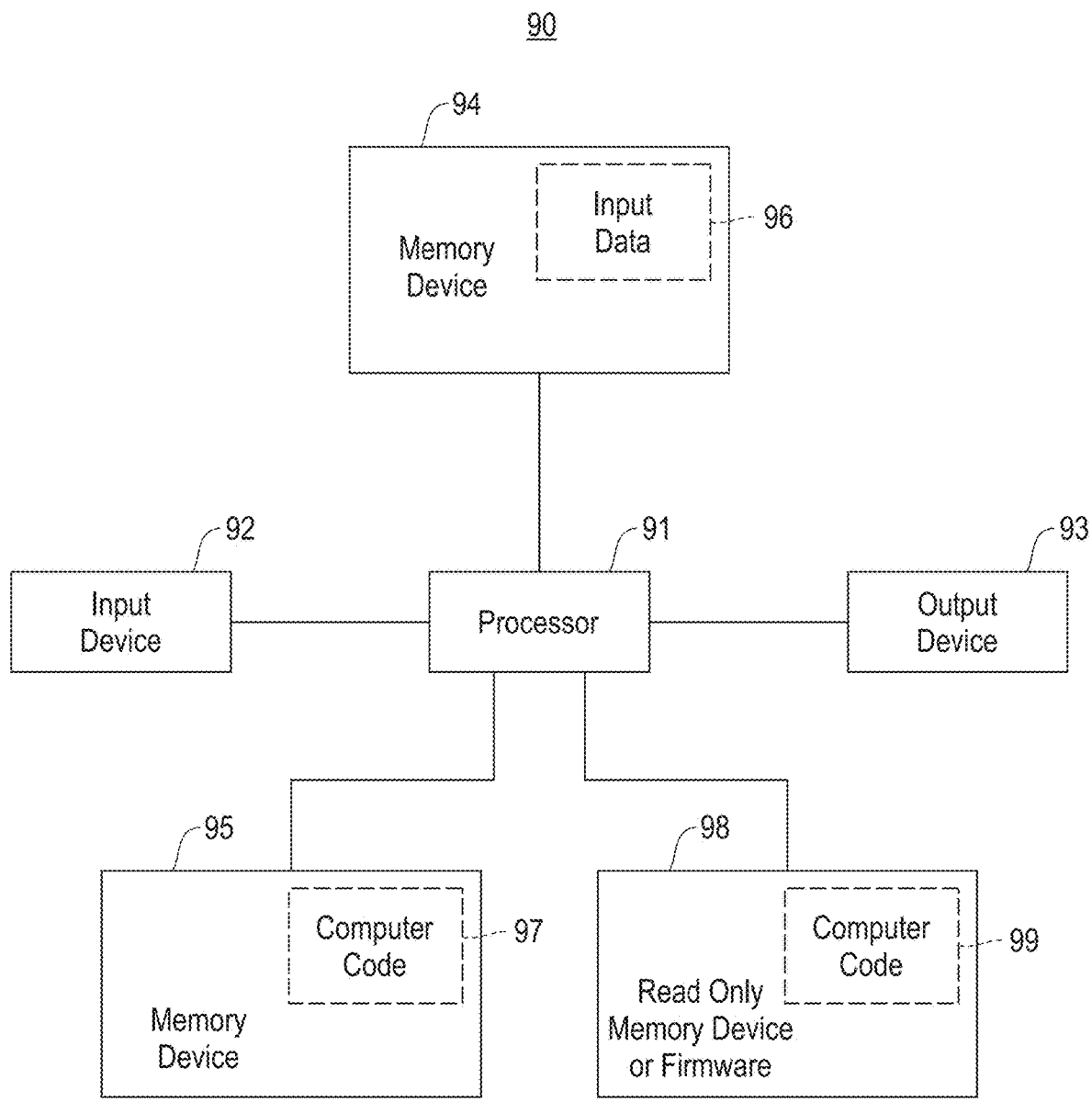
FIG. 9 illustrates a computer system, in accordance with embodiments of the present invention.

FIG. 9 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention.

The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 98 (e.g., including algorithms) may be stored on a static, nonremovable, read-only storage medium such as a Read-Only Memory (ROM) device 99, or may be accessed by processor 91 directly from such a static, nonremovable, read-only medium 99. Similarly, in some embodiments, stored computer program code 97 may be stored as computer-readable firmware 99, or may be accessed by processor 91 directly from such firmware 99, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
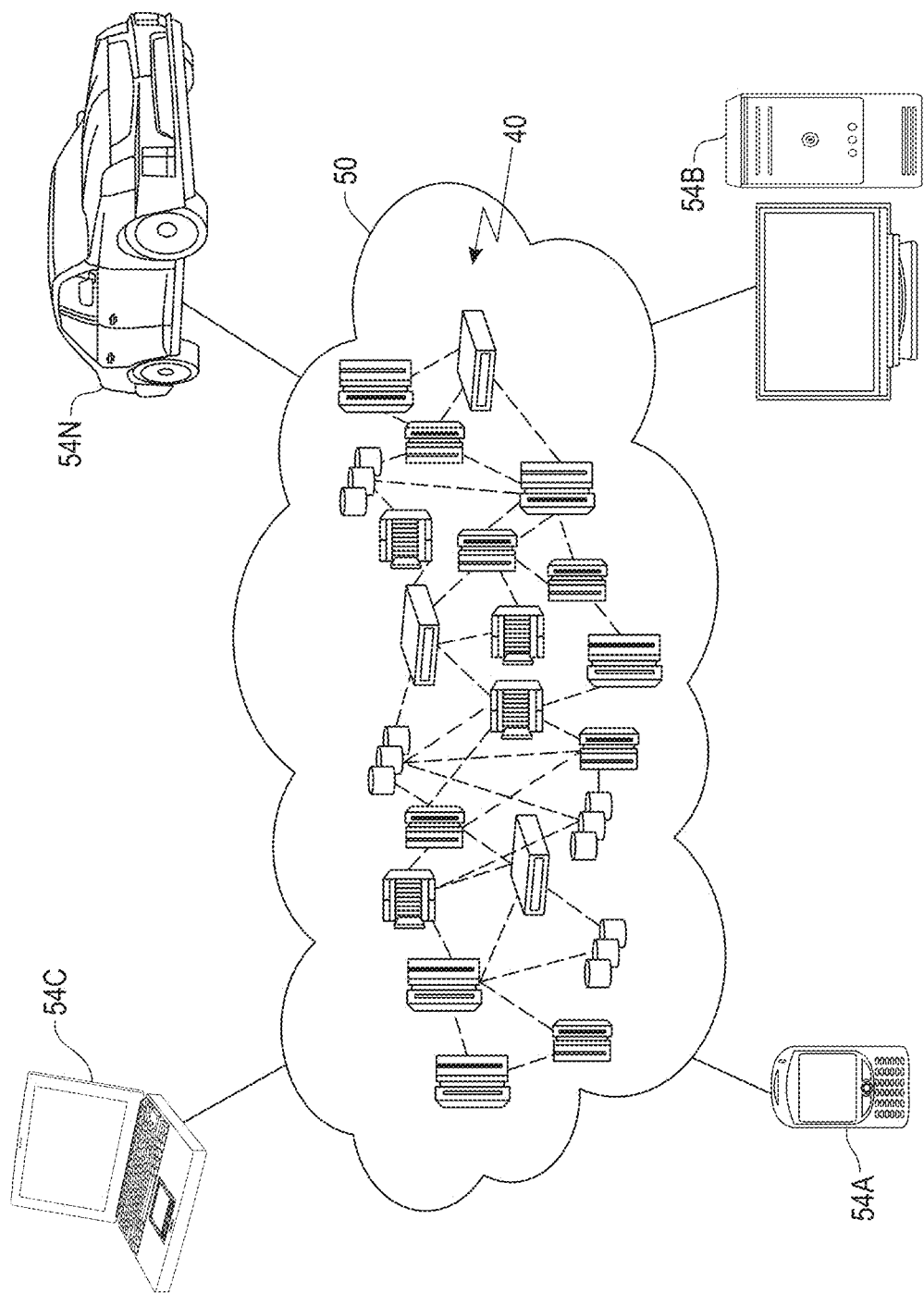
FIG. 10 depicts a cloud computing environment, in accordance with embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
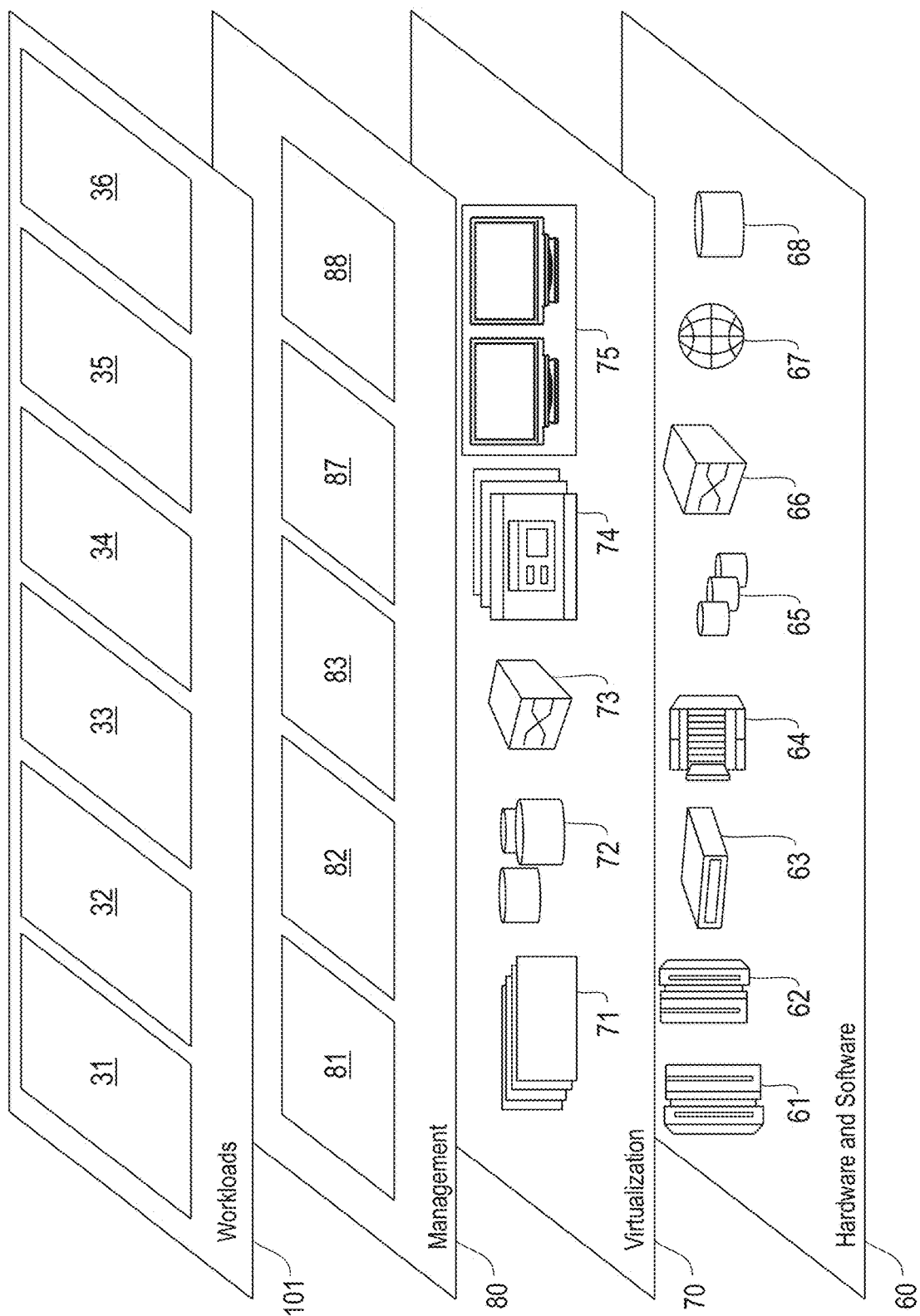
FIG. 11 depicts abstraction model layers, in accordance with embodiments of the present invention.

Referring now to FIG. 11, a set of functional abstraction layers provided by cloud computing environment 50 (FIG. 10) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 30 provides examples of functionality for which the cloud computing environment may be utilized. Examples of workloads and functions which may be provided from this layer include: mapping and navigation 31; software development and lifecycle management 32; virtual classroom education delivery 33; data analytics processing 34; transaction processing 35; and translation, using a beam search, of a source sentence in a source language into a target sentence in a target language 36.

Examples and embodiments of the present invention described herein have been presented for illustrative purposes and should not be construed to be exhaustive. While embodiments of the present invention have been described herein for purposes of illustration, many modifications and changes will become apparent to those skilled in the art. The description of the present invention herein explains the principles underlying these examples and embodiments, in order to illustrate practical applications and technical improvements of the present invention over known technologies, computer systems, and/or products.

What is claimed is:

1. A method for translating, using a beam search, a sentence S comprising n source words $S_1, \ldots, S_n$ in a source language into a sentence T comprising n target words $T_1, \ldots, T_n$ in a target language having a vocabulary characterized by a vocabulary vector V of m vocabulary words denoted as $V_1, \ldots, V_m$, wherein n≥2 and m≥3, said method comprising: performing in sequence, by one or more processors of a computer system, successive iterations 1, 2, ... of an iterative process, wherein after setting i to 1 and $J_1$ to 1, performing iteration i of the iterative process comprises:

generating, using a sequence-to-sequence model, $J_i$ probability vectors $P_{ij}$(j=1, 2, ..., $J_i$), wherein each probability vector $P_{ij}$ has m elements $P_{ijk}$(k=1, 2, ..., m), wherein each element $P_{ijk}$ of the probability vector $P_{ij}$ is a conditional probability of a respective vocabulary word $V_k$ being a translation of the source word $S_i$, wherein for i>1, the vocabulary word $V_k$ (k=1, 2, ..., m) terminates a target vector of vocabulary words selected in iteration i−1;

sorting each probability vector $P_{ij}$(j=1, 2, ..., $J_i$) in descending order or ascending order of the elements in each probability vector $P_{ij}$;

generating $J_i$ probability difference vectors respectively corresponding to the $J_i$ sorted probability vectors, wherein each element of each probability difference vector is a numerical difference between adjacent elements in respective sorted probability vectors;

if i<n, determining, using the $J_i$ probability difference vectors, a beam width $B_i$ via execution of a fully connected neural network (FCNN) and computing $J_{i+1}$ as equal to $B_i$;

if i=n, setting the beam width $B_n$ equal q, wherein q is a specified positive integer subject to 1≤q≤n;

selecting $B_i$ vocabulary words corresponding to the $B_i$ highest conditional probabilities in the $J_i$ probability vectors $P_{ij}$(j=1, 2, ..., $J_i$);

if i=1, generating $B_i$ target vectors respectively comprising the selected $B_i$ vocabulary words or if i>1, generating the $B_i$ target vectors by adding each selected vocabulary word to the end of a respective target vector generated in iteration i−1, wherein each target vector generated in iteration i has a translation probability equal to the conditional probability of the selected vocabulary word positioned at the end of the target vector;

if at least one stop condition is satisfied, then outputting the $B_n$ target vectors and stopping the iterative process, wherein the at least one stop condition comprises a first stop condition of i=n;

if the at least one stop condition is not satisfied, then incrementing i by 1 and looping back to said generating the $J_i$ probability vectors to perform the next iteration i.

2. The method of claim 1, wherein $J_i$=1, and wherein said determining the beam width $B_i$ comprises:

providing the probability difference vector as input to the FCNN; and receiving the beam width $B_i$ as output from execution of FCNN.

3. The method of claim 1, wherein $J_i$≥2, and wherein said determining the beam width $B_i$ comprises:

computing an average probability difference vector as an arithmetic average of the $J_i$ probability difference vectors; and providing the average probability difference vector as input to the FCNN; and receiving the beam width $B_i$ as output from execution of the FCNN.

4. The method of claim 1, wherein $J_i$≥2, and wherein said determining the beam width $B_i$ comprises:

providing each probability difference vector as input to the FCNN and receiving one beam width from execution of the FCNN for each probability difference vector, which results in $J_i$ beam widths from the FCNN respectively corresponding to the $J_i$ probability difference vectors; and computing the beam width $B_i$ as an arithmetic average of the $J_i$ beam widths and if the computed $B_i$ has a decimal part unequal to 0.5 then rounding the computed $B_i$ to a nearest integer, and if the computed Bi has a decimal part equal to 0.5 then rounding the computed Bi upward to a next integer.

5. The method of claim 1, wherein the at least one stop conditions comprises a second stop condition of a highest probability target vector generated in iteration i having a translation probability of at least a specified threshold probability.

6. The method of claim 1, wherein said outputting further comprises outputting the translation probability of each of the outputted target vectors.

7. The method of claim 1, wherein the sequence-to-sequence model uses an encoder and decoder framework with Long Short Term Memory (LSTM) or Gated Recurrent Unit (GRU) as basic blocks.

8. A computer program product, comprising one or more computer readable hardware storage devices having computer readable program code stored therein, said program code containing instructions executable by one or more processors of a computer system to implement a method for translating, using a beam search, a sentence S comprising n source words $S_1, \ldots, S_n$ in a source language into a sentence T comprising n target words $T_1, \ldots, T_n$ in a target language having a vocabulary characterized by a vocabulary vector V of m vocabulary words denoted as $V_1, \ldots, V_m$, wherein n≥2 and m≥3, said method comprising: performing in sequence, by the one or more processors, successive iterations 1, 2, ... of an iterative process, wherein after setting i to 1 and $J_1$ to 1, performing iteration i of the iterative process comprises:

generating, using a sequence-to-sequence model, $J_i$ probability vectors $P_{ij}$(j=1, 2, ..., $J_i$), wherein each probability vector $P_{ij}$ has m elements $P_{ijk}$(k=1, 2, ..., m), wherein each element $P_{ijk}$ of the probability vector $P_{ij}$ is a conditional probability of a respective vocabulary word $V_k$ being a translation of the source word $S_i$, wherein for i>1, the vocabulary word $V_k$ (k=1, 2, ..., m) terminates a target vector of vocabulary words selected in iteration i−1;

sorting each probability vector $P_{ij}$(j=1, 2, ..., $J_i$) in descending order or ascending order of the elements in each probability vector $P_{ij}$;

generating $J_i$ probability difference vectors respectively corresponding to the $J_i$ sorted probability vectors, wherein each element of each probability difference vector is a numerical difference between adjacent elements in respective sorted probability vectors;

if i<n, determining, using the $J_i$ probability difference vectors, a beam width $B_i$ via execution of a fully connected neural network (FCNN) and computing $J_{i+1}$ as equal to $B_i$;

if i=n, setting the beam width $B_n$ equal q, wherein q is a specified positive integer subject to 1≤q≤n;

selecting $B_i$ vocabulary words corresponding to the $B_i$ highest conditional probabilities in the $J_i$ probability vectors $P_{ij}$(j=1, 2, ..., $J_i$);

if i=1, generating $B_i$ target vectors respectively comprising the selected $B_i$ vocabulary words or if i>1, generating the $B_i$ target vectors by adding each selected vocabulary word to the end of a respective target vector generated in iteration i−1, wherein each target vector generated in iteration i has a translation probability equal to the conditional probability of the selected vocabulary word positioned at the end of the target vector;

if at least one stop condition is satisfied, then outputting the $B_n$ target vectors and stopping the iterative process, wherein the at least one stop condition comprises a first stop condition of i=n;

if the at least one stop condition is not satisfied, then incrementing i by 1 and looping back to said generating the $J_i$ probability vectors to perform the next iteration i.

9. The computer program product of claim 8, wherein $J_i=1$, and wherein said determining the beam width $B_i$ comprises:

providing the probability difference vector as input to the FCNN; and receiving the beam width $B_i$ as output from execution of FCNN.

10. The computer program product of claim 8, wherein $J_i \geq 2$, and wherein said determining the beam width $B_i$ comprises:

computing an average probability difference vector as an arithmetic average of the $J_i$ probability difference vectors; and providing the average probability difference vector as input to the FCNN; and receiving the beam width $B_i$ as output from execution of the FCNN.

11. The computer program product of claim 8, wherein $J_i \geq 2$, and wherein said determining the beam width $B_i$ comprises:

providing each probability difference vector as input to the FCNN and receiving one beam width from execution of the FCNN for each probability difference vector, which results in $J_i$ beam widths from the FCNN respectively corresponding to the $J_i$ probability difference vectors; and computing the beam width $B_i$ as an arithmetic average of the $J_i$ beam widths and if the computed $B_i$ has a decimal part unequal to 0.5 then rounding the computed $B_i$ to a nearest integer, and if the computed $B_i$ has a decimal part equal to 0.5 then rounding the computed $B_i$ upward to a next integer.

12. The computer program product of claim 8, wherein the at least one stop conditions comprises a second stop condition of a highest probability target vector generated in iteration i having a translation probability of at least a specified threshold probability.

13. The computer program product of claim 8, wherein said outputting further comprises outputting the translation probability of each of the outputted target vectors.

14. The computer program product of claim 8, wherein the sequence-to-sequence model uses an encoder and decoder framework with Long Short Term Memory (LSTM) or Gated Recurrent Unit (GRU) as basic blocks.

15. A computer system, comprising one or more processors, one or more memories, and one or more computer readable hardware storage devices, said one or more hardware storage devices containing program code executable by the one or more processors via the one or more memories to implement a method for translating, using a beam search, a sentence S comprising n source words $S_i, \ldots, S_n$ in a source language into a sentence T comprising n target words $T_1, \ldots, T_n$ in a target language having a vocabulary characterized by a vocabulary vector V of m vocabulary words denoted as $V_1, \ldots, V_m$, wherein n≥2 and m≥3, said method comprising: performing in sequence, by the one or more processors, successive iterations 1, 2, ... of an iterative process, wherein after setting i to 1 and $J_1$ to 1, performing iteration i of the iterative process comprises:

generating, using a sequence-to-sequence model, $J_i$ probability vectors $P_{ij}(j=1, 2, \ldots, J_i)$, wherein each probability vector $P_{ij}$ has m elements $P_{ijk}(k=1, 2, \ldots, m)$, wherein each element $P_{ijk}$ of the probability vector $P_{ij}$ is a conditional probability of a respective vocabulary word $V_k$ being a translation of the source word $S_i$, wherein for i>1, the vocabulary word $V_k$ (k=1, 2, ..., m) terminates a target vector of vocabulary words selected in iteration i−1;

sorting each probability vector $P_{ij}(j=1, 2, \ldots, J_i)$ in descending order or ascending order of the elements in each probability vector $P_{ij}$;

generating $J_i$ probability difference vectors respectively corresponding to the $J_i$ sorted probability vectors, wherein each element of each probability difference vector is a numerical difference between adjacent elements in respective sorted probability vectors;

if i<n, determining, using the $J_i$ probability difference vectors, a beam width $B_i$ via execution of a fully connected neural network (FCNN) and computing $J_{i+1}$ as equal to $B_i$;

if i=n, setting the beam width $B_n$ equal q, wherein q is a specified positive integer subject to 1≤q≤n;

selecting & vocabulary words corresponding to the & highest conditional probabilities in the $J_i$ probability vectors $P_{ij}(j=1, 2, \ldots, J_i)$;

if i=1, generating $B_i$ target vectors respectively comprising the selected $B_i$ vocabulary words or if i>1, generating the $B_i$ target vectors by adding each selected vocabulary word to the end of a respective target vector generated in iteration i−1, wherein each target vector generated in iteration i has a translation probability equal to the conditional probability of the selected vocabulary word positioned at the end of the target vector;

if at least one stop condition is satisfied, then outputting the $B_n$ target vectors and stopping the iterative process, wherein the at least one stop condition comprises a first stop condition of i=n;

if at least one stop condition is not satisfied, then incrementing i by 1 and looping back to said generating the $J_i$ probability vectors to perform the next iteration i.

16. The computer system of claim 15, wherein $J_{i=1}$, and wherein said determining the beam width $B_i$ comprises:

providing the probability difference vector as input to the FCNN; and receiving the beam width Bias output from execution of FCNN.

17. The computer system of claim 15, wherein $J_i \geq 2$, and wherein said determining the beam width $B_i$ comprises:

computing an average probability difference vector as an arithmetic average of the $J_i$ probability difference vectors; and providing the average probability difference vector as input to the FCNN; and receiving the beam width $B_i$ as output from execution of the FCNN.

18. The computer system of claim 15, wherein $J_i \geq 2$, and wherein said determining the beam width $B_i$ comprises:

providing each probability difference vector as input to the FCNN and receiving one beam width from execution of the FCNN for each probability difference vector, which results in $J_i$ beam widths from the FCNN respectively corresponding to the $J_i$ probability difference vectors; and computing the beam width $B_i$ as an arithmetic average of the $J_i$ beam widths and if the computed $B_i$ has a decimal part unequal to 0.5 then rounding the computed $B_i$ to a nearest integer, and if the computed $B_i$ has a decimal part equal to 0.5 then rounding the computed $B_i$ upward to a next integer.

19. The computer system of claim 15, wherein the at least one stop condition comprise a second stop condition of a highest probability target vector generated in iteration i having a translation probability of at least a specified threshold probability.

20. The computer system of claim 15, wherein said outputting further comprises outputting the translation probability of each of the outputted target vectors.

* * * * *